US005288093A

United States Patent [19]

Gross

[11] Patent Number: 5,288,093

[45] Date of Patent: Feb. 22, 1994

[54] COUPLER FOR A MOBILE INTRAVENOUS SUPPORT STAND AND MOBILE PATIENT TRANSPORT MEANS

[76] Inventor: Gary D. Gross, 2790 Bentwood Dr., Marietta, Ga. 30062

[21] Appl. No.: 52,659

[22] Filed: Apr. 26, 1993

Related U.S. Application Data

[63] Continuation-in-part of Ser. No. 788,243, Nov. 5, 1991, abandoned.

[51] Int. Cl.[5] .......................... B60D 1/00; A47C 7/62

[52] U.S. Cl. ................................ 280/292; 280/304.1; 248/288.5

[58] Field of Search .................. 280/250.1, 288.4, 292, 280/304.1, 493, 494, 503; 403/122, 315, 325, 331; 248/125, 288.5; 5/658, 504.1

[56] References Cited

U.S. PATENT DOCUMENTS

| | | | |
|---|---|---|---|
| 4,511,158 | 4/1985 | Varga et al. | 280/304.1 X |
| 5,118,127 | 6/1992 | Partington | 280/304.1 X |
| 5,219,139 | 6/1993 | Hertzler et al. | 280/304.1 X |

FOREIGN PATENT DOCUMENTS

| | | | |
|---|---|---|---|
| 0789207 | 9/1968 | Canada | 5/658 |
| 3725689 | 3/1988 | Fed. Rep. of Germany | 280/304.1 |
| 8902235 | 3/1989 | World Int. Prop. O. | 5/658 |

*Primary Examiner*—Margaret A. Focarino
*Assistant Examiner*—Victor E. Johnson
*Attorney, Agent, or Firm*—Rodgers & Rodgers

[57] ABSTRACT

A coupler for an IV stand and a mobile patient transporter having a first coupling block mounted on the IV stand and a second coupling block mounted on the patient transporter. A connecting bar interconnects the coupling blocks with locking means formed in the coupling blocks to secure the connecting bar thereto.

4 Claims, 1 Drawing Sheet

COUPLER FOR A MOBILE INTRAVENOUS SUPPORT STAND AND MOBILE PATIENT TRANSPORT MEANS

This is a continuation-in-part of application Ser. No. 07/788,243 filed Nov. 5, 1991, now abandoned.

BACKGROUND OF THE INVENTION

Generally in hospitals, nursing homes and like institutions, when an individual is interconnected to an intravenous bottle, the bottle is attached to a conventional mobile IV support stand. When it becomes necessary to move the patient from one location to another, normally the patient transport means is in the form of a wheelchair, gurney or hospital bed. Usually the patient is required to grasp the IV stand pole while being pushed down a long hallway by a hospital attendant. At other times, it is necessary for the medical technician to both push the patient transport means and maneuver the IV stand. Of course, either procedure is awkward and inefficient. Also, since health care facilities have far fewer IV stands than wheelchairs, beds, etc., it is impractical to permanently affix an IV stand to each and every patient transport means. Therefore, it is necessary to be able to quickly disconnect an IV stand from one transport means and reconnect it to another.

SUMMARY OF THE INVENTION

By this invention, a coupler for a mobile IV support stand and mobile patient transport means is provided and comprises a first coupling means disjointably mounted on the support stand, a second coupling means disjointably mounted on the transport means, an elongated bar interconnecting the first and second coupling means, and locking means securing the elongated bar to the first and second coupling means.

DETAILED DESCRIPTION OF THE INVENTION

Figure 1:
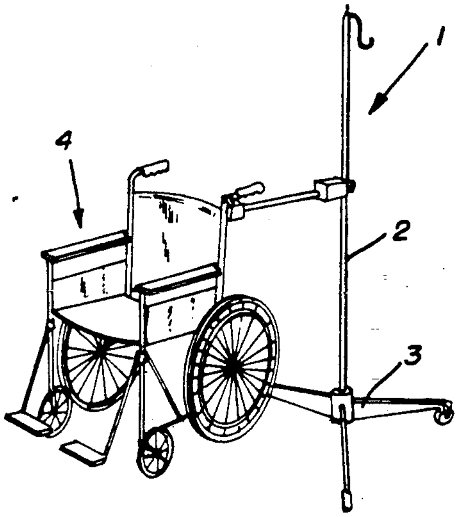
FIG. 1 is a perspective view of a coupler according to this invention used in conjunction with a conventional wheelchair and a mobile IV stand.
Figure 2:
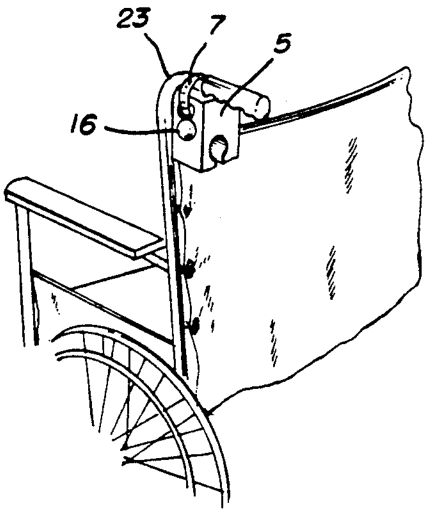
FIG. 2 is an enlarged perspective view showing a coupling block attached to a wheelchair.

In the drawings, the numeral 1 generally designates an IV stand having vertical pole 2 extending upwardly from conventional wheeled means 3. The numeral 4 generally designates a conventional wheelchair.

According to this invention, coupling means is provided, in part, in the form of coupling block 5 with recessed cavity 6 formed therein. Recessed cavity 6 comprises slot 6*a* and enlarged inner portion 6*b*. Attachment band 7 is secured to coupling block 5 at one end thereof by means of bolt 8 with the opposite end of attachment band 7 being attached to coupling block 5 in a similar fashion.

Further, coupling means for IV stand 1 is provided in the form of coupling block 9. Recessed cavity 10 is formed in coupling block 9 and comprises slot 10*a*. An enlarged inner portion 10*b* is formed in coupling block 9 in a fashion similar to enlarged inner portion 6*b* of recessed cavity 6. Coupling block 9 is disjointably mounted on IV stand 1 by means of threaded screw 11 which is tightened into a frictional relationship with vertical pole 2, in known fashion, by simply manually turning knob 12.

According to a feature of this invention, elongated connecting bar 13 is provided. Formed on the ends of connecting bar 13 are enlarged end portions 14 and 15.

Figure 6:
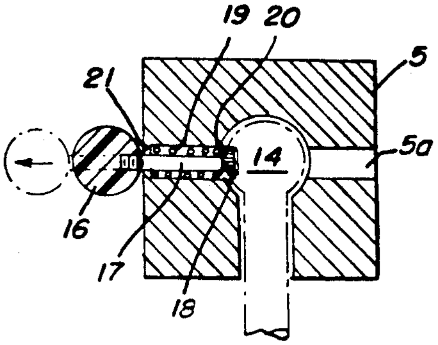
FIG. 6 is a sectional view taken along the line 6—6 in FIG. 5.

For the purpose of retaining enlarged end portion 14 in recessed cavity 6, a quick release locking means is provided. More specifically, the locking means includes knob 16 which is screwed onto rod 17. Stop 18 is attached to the end of rod 17 opposite knob 16. As best shown in FIG. 6, spring 19 is disposed between surface 20 of stop 18 and surface 21 of coupling block 5. Again, as best shown in FIG. 6, the outer end of stop 18 extends into enlarged inner portion 6*b*. Aperture 5*a* is formed in coupling block 5 to allow rod 17, spring 19 and stop 18 to be inserted into position whereby knob 16 is then screwed onto rod 17. Similar quick release locking means to that described in connection with coupling block 5 is provided in connection with coupling block 9 and is identified by the numeral 22.

According to this invention, in order to form an interlocking relationship between coupling block 5 and connecting bar 13, knob 16 is simply pulled outwardly from coupling block 5 thereby allowing enlarged end portion 14 of connecting bar 13 to enter enlarged inner portion 6*b* of recessed cavity 6. Since the locking means is biased inwardly, the release of knob 16 causes stop 18 to enter recess cavity 6. With stop 18 positioned in front of end portion 14, as viewed in FIG. 6, connecting bar 13 is, in effect, disposed in an interlocking relationship with coupling block 5 since end portion 14 is prevented from movement outwardly through inner portion 6*b*. More specifically, connecting bar 13 and coupling block 5 are interlocked when the distance between the inner end of stop 18 and the surface of inner portion 6*b* adjacent rod 17 is greater than the distance between the same portion of the inner surface and the associated portion of end portion 14. Further end portion 14 is prevented from dropping downwardly through slot 6*a* since it is of larger diameter than the width of slot 6*a*.

Figure 3:
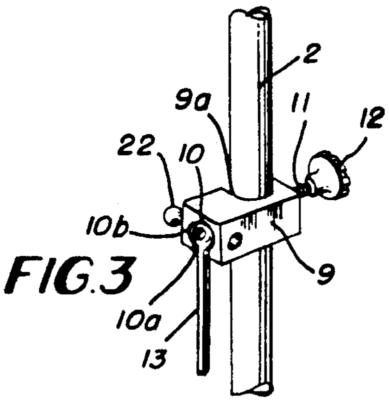
FIG. 3 is an enlarged view of a portion of the coupler attached to an IV stand pole.
Figure 4:
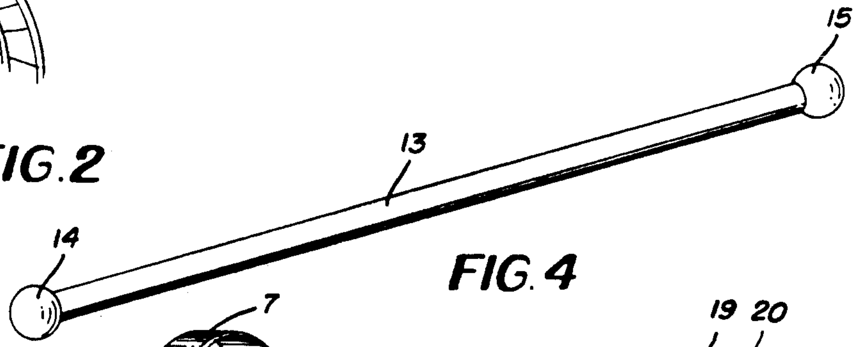
FIG. 4 is an enlarged perspective view of a connecting bar.
Figure 5:
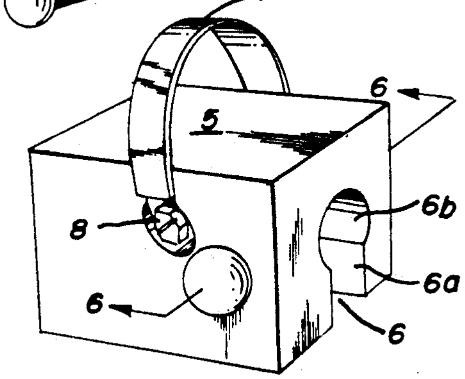
FIG. 5 is an enlarged perspective view of one of the coupling blocks.

When it is desired to transport wheelchair 4 and IV stand 1, in tandem, it is simply necessary to take the coupler as shown in FIG. 3 and swing connecting bar 13 and coupling block 5 upwardly through an angle of approximately 90 degrees whereby connecting bar 13 is disposed in a substantially horizontal position. Coupling block 5 is then attached to arm 23 of wheelchair 4 by means of attached band 7. Wheelchair 4, IV stand 1 and the coupler then appear as shown in FIG. 1. Of course, if desired, the connecting bar can be disconnected from coupling block 9 and allowed to swing downwardly through slot 10*a* to a vertical storage position interconnected with coupling block 5.

Therefore, by this invention, coupling means is provided which allows a mobile IV stand to be disjointably attached to mobile patient transport means such as a wheelchair, stretcher, bed etc. Since connecting bar 13 is not positioned in a fixed relationship with respect to coupling blocks 5 or 9, IV stand 1 can be maneuvered to any desired position relative to the patient transport means thereby providing versatility in the transport of the IV stand.

Also, by this invention, a device is provided which is easily detachable from either the patient transport means or the IV stand. After such detachment the device remains attached to either the patient transport means or the IV stand wherein it is maintained in a convenient out of the way vertical configuration. Subsequently, as desired, the device can be maneuvered horizontally for the purpose of quickly interconnecting the mobile transport means and the IV stand.

I claim:

1. A coupler for a mobile intravenous support stand and mobile transport means comprising:

a first coupling means disjointably mounted on said support stand, a second coupling means disjointably mounted on said transport means, an elongated connecting bar interconnectable with said first and second coupling means, recessed cavities formed respectively in said first and second coupling means, enlarged end portions formed on said connecting bar and being removably disposed respectively within said cavities, one of said coupling means having locking means, said locking means being elongated and having first and second oppositely disposed ends, said recessed cavity of said one of said coupling means having an inner surface, said locking means extending exteriorly of said one of said coupling means at said first end thereof and said second end thereof extending into said respective cavity immediately adjacent a portion of said inner surface, said second end being selectively disposed in proximity to said enlarged end portion disposed in said respective cavity, and the distance between said second end and said portion of said inner surface being greater than the distance between said enlarged end portion and said portion of said inner surface thereby preventing removal of said enlarged portion from said respective cavity.

2. A coupler according to claim 1, wherein a slot is formed in the other of said coupling means to allow said connecting bar to swing through an angle of approximately 90 degrees from a substantially horizontal position to a substantially vertical position.

3. A coupler according to claim 1 wherein said locking means is spring biased against said coupling means.

4. A coupler according to claim 1 wherein an elongated aperture is formed in said one of said coupling means and coaxial with said locking means.

* * * * *